(12) United States Patent
Gaillard et al.

(10) Patent No.: US 8,221,839 B2
(45) Date of Patent: Jul. 17, 2012

(54) METHOD FOR APPLYING AN ANTI-CORROSION COATING ON PARTS OF A DUCT INCLUDING THE USE OF A SILANE AQUEOUS SOLUTION AND AN EPOXY POWDERY PAINT

(75) Inventors: Gerard Gaillard, Vernon (FR); Jean-Luc Bouliez, Isneauville (FR)

(73) Assignee: BS Coatings SAS, Aubevoye (FR)

( * ) Notice: Subject to any disclaimer, the term of this patent is extended or adjusted under 35 U.S.C. 154(b) by 506 days.

(21) Appl. No.: 12/515,570

(22) PCT Filed: Oct. 9, 2007

(86) PCT No.: PCT/FR2007/001647
§ 371 (c)(1),
(2), (4) Date: Jun. 24, 2009

(87) PCT Pub. No.: WO2008/062108
PCT Pub. Date: May 29, 2008

(65) Prior Publication Data
US 2010/0055327 A1    Mar. 4, 2010

(30) Foreign Application Priority Data
Nov. 22, 2006  (FR) .................................... 06 10232

(51) Int. Cl.
*B05D 3/12* (2006.01)
*B05D 3/00* (2006.01)
(52) U.S. Cl. .......................... 427/290; 427/289; 427/299
(58) Field of Classification Search .................. 427/290, 427/289, 299
See application file for complete search history.

(56) References Cited

U.S. PATENT DOCUMENTS

| 5,633,038 A | * | 5/1997 | Ruschau | 427/239 |
| 6,065,781 A | * | 5/2000 | Titus | 285/55 |
| 6,444,325 B1 | * | 9/2002 | Roesler et al. | 428/447 |
| 2004/0062873 A1 | | 4/2004 | Jung et al. | |

FOREIGN PATENT DOCUMENTS

| DE | 10308237 A1 | 9/2004 |
| WO | 9502018 A1 | 1/1995 |

OTHER PUBLICATIONS

A.D. Yakovlev, Powder paints, "Khimiya" ("Chemistry"), Publishing House, 1987, pp. 176-179, Leningrad Division, Leningrad.
A.D. Yakovlev, Chemistry and technology of paint-and-lacquer coatings, "Khimiya" ("Chemistry"), Publishing House, 1981, pp. 280-284, Leningrad Division, Leningrad.
International Search Report dated Jun. 5, 2008.
PCT/IPEA/409 dated Apr. 22, 2009.

* cited by examiner

*Primary Examiner* — Kelly M Gambetta
(74) *Attorney, Agent, or Firm* — Bachman & LaPointe, P.C.

(57) ABSTRACT

A method for applying a single-layer or multi-layer anti-corrosion coating on a metallic substrate being part of a pipe or a duct accessory to be buried or submerged for conveying a fluid such as water, petroleum products, gas or sanitizing products. including a) preparing the surface of the substrate by mechanical means only; b) applying an adhesion promoter on the prepared surface comprising an aqueous solution of at least one silane without any further chemical process; C) applying a layer of an epoxy-resin powdery paint on the surface coated with the adhesion promoter; and d) applying at least one thermal process to the surface at least of the substrate, wherein at least one step d) for thermal processing is carried out between steps a) and b) or between steps b) and c).

17 Claims, No Drawings

METHOD FOR APPLYING AN ANTI-CORROSION COATING ON PARTS OF A DUCT INCLUDING THE USE OF A SILANE AQUEOUS SOLUTION AND AN EPOXY POWDERY PAINT

BACKGROUND (1) Field of the Invention

The invention relates generally to the field of the anticorrosion protection of pipelines.

The term "pipeline" is understood to mean a conduit for the long-distance transportation of fluids, such as water, petroleum products, gas or drainage products.

More specifically, the invention relates, according to a first of its aspects, to a process for application of a monolayer or multilayer anticorrosion coating to a metal substrate forming part of a pipe or of a fitting of a pipeline intended to be buried or immersed for the transportation of fluids, such as water, petroleum products, gas or drainage products.

(2) Prior Art

The anticorrosion protection of a pipeline, in other words of a buried or immersed conduit used in particular for the transportation of water, oil or gas, has been based on the same principle for decades: an adhesive organic coating, which is a passive barrier to water and to oxygen, coupled to electrochemical active protection which consists in bringing the material constituting the pipeline to a potential such that any oxidation of the iron forming part of the composition of these materials is inhibited. It has always been carried out either by the method of a sacrificial anode or by impressed current. Cathodic protection is involved.

The various systems of organic coatings used in the field of anticorrosion protection of pipelines or conduits include systems based on epoxy powder paints of high reactivity used as monolayer coating or as primer of a complex "multilayer" system, for example a three-layer system, as it is composed of this primer, of an adhesive based on modified polyolefin and of a final polyolefin-based layer.

The organic coatings intended for the anticorrosion protection of pipelines are subject to operating stresses which combine temperature and humidity. This is because the pipelines can be buried in a more or less wet soil or placed on the seabed. Moreover, the fluid may be heated in order to lower its viscosity so as to minimize the head losses which occur during transportation within the pipeline network, the length of which can represent from several hundred to several thousand kilometers.

The operating temperature can vary from 20 to 150 degrees Celsius (° C.). The combination of temperature and humidity results in an acceleration in the penetration of water into the coating material. This phenomenon is reflected by a loss in adhesion of the coating with regard to the metal support constituting the pipeline.

The loss in adhesion is harmful to the continuity of the anticorrosion protection.

The pipeline components are conventionally subjected to a surface preparation which can consist in mechanically blasting the substrate.

Chemical treatments of the metal surfaces can also be employed after this surface preparation in order to improve the adhesion in a wet environment of the organic coatings. These chemical treatments are conventionally based on chromates or on phosphates.

There are several disadvantages to the application of solutions based on chromates or on phosphates. The application involves rinsing operations, which complicate the application process and result in the formation of additional waste. It involves, after drying, an operation for the thermal conversion of the chromates or phosphates, which renders the process expensive. It involves the use of toxic products, in the case of the chromates.

SUMMARY OF THE INVENTION

In this context, an aim of the present invention is to provide a process devoid of at least one of the limitations mentioned above.

To this end, the invention relates to a process for the application of a monolayer or multilayer anticorrosion coating to a metal substrate forming part of a pipeline intended to be buried or immersed for the transportation of fluids, such as water, petroleum products, gas or drainage products, characterized in that it comprises:

a) a solely mechanical preparation of the surface of the substrate, including a blasting by projection of abrasives, in particular in order to obtain a surface cleanliness of at least Sa 2.5 and a roughness Rz of at least 40 micrometers;

b) an application of an adhesion promoter to the prepared surface composed of an aqueous solution of at least one silane, without additional chemical treatment;

c) an application of a layer of powder paint based on epoxy resin to the surface coated with the adhesion promoter; and d) at least one heat treatment of at least the surface of the substrate;

at least one stage d) of heat treatment being carried out between stages a) and b) or between stages b) and c).

The invention exhibits the advantage of providing for the replacement of toxic chromates by silanes.

The process according to the invention makes it possible to improve the adhesion in a wet environment of powder paints based on thermosetting resins, such as epoxide resins (or epoxy resins or epoxies), used as internal or external coating for metal pipes and fittings of pipelines intended for the transportation of fluids, such as gas, water, petroleum products or drainage products.

The term metal fitting is used to describe any component, preferably made of steel or of cast iron, which is incorporated in the pipeline network, other than the pipes. It can, for example, be a valve, a bend or a flange.

In addition, the silane solution is an aqueous solution devoid of organic solvent, which is advantageous environmentally and for the health and the safety of the users.

Despite the deposition of an aqueous solution and thus of a large amount of water at the surface of the metal substrate, the use of the process according to the invention makes it possible to avoid the formation of films of rust which would be due to rapid surface oxidation (flash rusting).

In particular, the surface preparation includes:

a drying of the substrate in order to remove therefrom any trace of moisture;

the mechanical blasting by projection of abrasives using at least one abrasive material, such as shot, sand, alumina or corundum; and removal of the dust generated by the blasting, for example by blowing and/or by sucking.

Such a surface preparation is targeted at obtaining a surface cleanliness of between Sa 2.5 and Sa 3 or at the level Sa 2.5 and a roughness Rz of between 40 and 150 micrometers or between 70 and 90 micrometers.

The use in the invention of a solely mechanical surface preparation devoid of chemical treatment also makes possible the use of a process which is advantageous in terms of health and safety.

In a preferred embodiment of the invention, the substrate is composed of a metal essentially including iron and is preferably composed of steel.

According to the invention, the silane can be any silane used as adhesion promoter of general formula R'Si(OR)$_3$ where R' is a group comprising at least one reactive organic radical and where OR is an alkoxy radical.

Preferably, said at least one silane is chosen from aminosilanes or epoxysilanes. For example, the silane can be N-(β-aminoethyl)-γ-aminopropyltrimethoxysilane or γ-glycidyloxypropyltrimethoxysilane.

The silane can advantageously be a prehydrolyzed silane, such as prehydrolyzed 3-aminopropylsilane.

Advantageously, the aqueous solution comprises between 0.5 and 20% by weight, preferably between 1 and 10% by weight, of silane.

The aqueous silane solution is preferably applied to the surface of the substrate according to a grammage of between 10 and 100 grams per square meter, preferably between 30 and 70 grams per square meter.

According to a specific version of the invention, a single stage d) of heat treatment is carried out between stages a) and b) or between stages b) and c).

The heating temperature is advantageously between 110 and 250 degrees Celsius, preferably between 150 and 240 degrees Celsius. The maximum temperature of 250° C. is suited in particular to the case where the application of silane is carried out before the heating, in that it does not cause decomposition of the silane.

According to a particularly advantageous embodiment of the invention, the surface preparation is devoid of any chemical treatment.

According to a preferred embodiment, the process according to the invention additionally comprises:

e) an application of an intermediate layer of a polyolefin-based adhesive to the surface coated with epoxide resin; and f) an application of a finishing layer of polyolefin, chosen from polyethylenes or polypropylenes, to the surface coated with the intermediate layer.

According to the invention, the metal substrate can be a pipe of the pipeline or can be a fitting of the pipeline. The pipes and the fittings constitute the components of a pipeline.

The process according to the invention makes it possible to treat the internal and external surfaces of these pipeline components. For the internal surfaces, a monolayer coating, i.e. a coating devoid of an intermediate layer and of a finishing layer, is generally applied. Preferably, for a pipe, the internal and external surfaces are treated successively and, for a fitting, all the surfaces are treated simultaneously.

The invention also relates to a pipeline metal component, such as a pipeline pipe or a pipeline fitting, intended to be buried or immersed for the transportation of fluids, such as water, petroleum products or gas, exhibiting at least one surface treated according to the process of the invention.

Other characteristics and advantages of the invention will clearly emerge from the detailed description which is made thereof below, by way of indication and without implied limitation.

DETAILED DESCRIPTION OF THE PREFERRED EMBODIMENT(S)

The surface of the metal substrate is treated in order to receive a coating which is:

either monolayer, that is to say resulting from the application of a powder paint comprising epoxide resin which is subjected to crosslinking via a hardener;

or multilayer, that is to say composed of a primer, which results from the application of a powder paint comprising epoxide resin which is subjected to crosslinking via a hardener, and of at least one additional layer, for example based on epoxy or on polyolefin.

A multilayer coating can in particular be a three-layer coating composed of the primer, of an intermediate layer, which is a polyolefin-based adhesive, and of a finishing layer of polyolefin, such as a polyethylene or a polypropylene.

The silane is applied, prior to the application of the monolayer or multilayer coating, to the surface of the metal pipes or fittings.

The type of silane forming the subject matter of the process of the invention is in solution in water. No organic solvent is added. This preparation makes it possible to be freed from the problems related to organic solvents concerning the environment, safety and health.

The type of silane forming the subject matter of the process of the invention is either a pure silane, diluted in water before it is applied, or a silane which is provided already in aqueous solution, that is to say prehydrolyzed.

The pure silane can in particular be of following general formula (I):

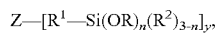

or of following formula (II):

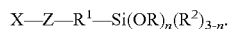

The index n represents an integer equal to 1, 2 or 3.

The index y represents an integer equal to 1 or 2. In the formula (II), y is equal to 1.

The n OR groups are each chosen from the methoxy CH$_3$O—, ethoxy CH$_3$CH$_2$O— or propoxy C$_3$H$_7$O— groups or their combinations.

The Z group represents a primary amine or a secondary amine functional group or also an epoxy functional group carried by a glycidyl ether group or by a cycloaliphatic group.

In the case where Z is a secondary amine and where y is equal to 1, Z can be bonded to an X group to give a silane of formula (II).

The X, R$^1$ and R$^2$ groups can each be chosen from an aliphatic, cycloaliphatic or aromatic carbon-comprising group. These carbon-comprising groups can include one or more heteroatoms, such as sulfur, nitrogen or oxygen. One or more radicals chosen from alkyl, alkenyl or aryl radicals or radicals comprising at least one functional group chosen from amine, amide, urea, acyl, carboxyl, phenol, ketone, ether, ester or mercaptan functional groups can be grafted to these carbon-comprising groups.

According to the invention, the pure silane is subjected in the presence of water, during its dilution, to a hydrolysis which converts the alkoxy functional group Si—(OR) of the silane to the silanol functional group Si—(OH) and to the alcohol ROH.

The Si—(OH) functional group is responsible for the chemical grafting to the metal and thus provides for a firm bond with the latter.

Nevertheless, the presence of Si—(OH) functional groups can, after condensation, result in the formation of the siloxane bond Si—O—Si, which is not only harmful to the stability of the silane in solution but also to the efficiency of the grafting reaction between the silane and the metal support.

An adjustment of the pH of the solution can result in a compromise between the rate of formation by hydrolysis of the Si—(OH) functional group, necessary for the grafting to the metal, and the stability on storage.

For example, for γ-glycidyloxypropyltrimethoxysilane, an adjustment of pH between 4 and 5 of the aqueous solution comprising 5% by weight of silane makes it possible to achieve this compromise.

The silanes in aqueous solution, or prehydrolyzed silanes, which can also be used in the invention are of the R'—Si—(OH)$_n$ type. R' is a group comprising at least one reactive organic radical. R' is preferably chosen from carbon-comprising groups comprising a secondary amine and/or a primary amine, which confer on the silanes a particularly advantageous stability in water.

These silanes in aqueous solution exhibit mainly two advantages.

The first advantage is related to the fact that the prehydrolyzed form of these silanes makes it possible to use a solution devoid of the alkoxy functional group Si—OR, which avoids the formation of the alcohol ROH in the water via the hydrolysis process, which constitutes a cosolvent harmful to the environment and the health of the users.

The second advantage is related to the fact that these silanes have been developed in order to confer a very high stability, up to several months, on the aqueous solution.

They are sold already in the form of an aqueous solution and can be subjected to an additional dilution in water.

For example, prehydrolyzed 3-aminopropylsilane comprising silanol functional groups without an alkoxy functional group is sold by Degussa in aqueous solution comprising 40% by weight of silane under the name "Dynasilan®", reference 1151. The latter can be subjected to dilution in water. The distinguishing feature of this silane is that it exhibits a very high stability in water despite the presence of the Si—(OH) functional groups.

Another example of commercial silane in the aqueous phase, "Silquest®" A-1106, comprising primary amines, of formula $(H_2N(CH_2)_3SiO_{1.5})_n$, can also advantageously be used in the context of the process of the present invention.

The use of a silane solution according to the process of the present invention requires neither chemical treatment of the metal support before the application of the silane solution nor rinsing after the application of the latter.

The silane solution forming the subject of the process of the present invention can comprise a dye diluted in the water in order for it to be easier to visualize the application of the silane solution to the metal support.

The process of the present invention is in accordance with the norms of the art relating to the application, to the walls of metal pipes, of coatings based on thermosetting resins. These norms or recommendations are described in several standards, in particular NFA 49716, NFA 49706, NFA 49710, NFA 49711 and CAN/CSA-Z245.20-02.

Whatever the type of coating, monolayer or multilayer, the epoxy layer is in contact with the metal support. It is thus indeed the epoxy which, in the coating systems to which the invention relates, provides for the adhesion to the metal support. It is thus essential for the adhesion performances of the epoxy layer to remain optimal when the coating is subjected to temperature and humidity stresses.

EXAMPLES

Example 1

Process for the surface treatment of a metal pipe and for the application of a monolayer coating based on epoxy powder paint.

The process takes place in the following way:

1) The pipes are dried in order to remove any trace of moisture. Drying is carried out by passing through an oven or using a flame.

2) After drying, the external surface of the metal pipes is mechanically blasted by projecting abrasives, such as shot, sand, alumina and/or corundum. This blasting operation confers, on the surface, a roughness profile having an Rz (according to the description of the standard ISO 4287-1) lying between 40 and 150 micrometers (μm), preferably between 60 and 90 micrometers.

3) The dust generated by this blasting operation is removed from the surface of the pipe, by blowing and/or sucking.

The surface cleanliness on conclusion of these operations must be between Sa 2.5 and Sa 3, according to the description of the standard ISO 8501-1.

4) The silane solution can subsequently be applied to the surface thus prepared of the pipe.

The silane solution exhibits an amount of active principle, that is to say of pure silane, of between 0.5 and 20% by weight, preferably of between 1 and 10% by weight, with respect to the total weight of the solution.

The silane solution is applied by mixed or airless spraying using a machine of airmix or airless type, or with a brush, or with a roller, or also by spreading or by dipping.

The silane solution is applied to the metal support according to a grammage of between 10 and 100 grams per square meter (g/m$^2$), preferably between 30 and 70 g/m$^2$.

5) On conclusion of the operation for the application of the silane solution, the surface of the pipe is not rinsed and is subjected directly to a rise in temperature up to a temperature of between 110 and 250 degrees Celsius (° C.), preferably between 150° C. and 240° C. The rise in temperature is conditioned by the kinetics of the crosslinking reaction of the epoxy resin and not by the need for thermal conversion of the silane, contrary to the chromate solutions, which require thermal conversion temperatures generally lying above 220° C.

The advantage of this process is that it makes it possible to use aqueous solutions without bringing about rapid oxidation and thus formation of rust on the metal, given that the operation of heating the pipe takes place immediately after the application of the aqueous silane solution. This heating of the pipe results in the immediate drying of the silane solution, by evaporation of water, and thus prevents this water from leading to the oxidation process.

The heating of the pipe, before application of the epoxy powder, is provided either by passing the pipe through an inductor or by passing the pipe through an oven heated with gas or fuel oil or supplied with electricity.

According to the invention, an alternative form of this process consists in applying the silane solution after the heating of the pipe, in other words in inverting stages 4) and 5). The application of the silane solution to the hot support results in the immediate evaporation of the water and for this reason prevents oxidation and the formation of rust at the surface of the metal.

6) As soon as the surface of the metal tube has been brought to a satisfactory temperature, the epoxy powder is applied according to an electrostatic or triboelectric process.

The epoxy powder paint applied to the treated support passes through three transformation phases: melting, gelling and solidifying. This process is provided for by the supply of heat at the surface of the pipe, which results in the crosslinking mechanism.

The thermal inertia of the pipes is generally sufficient for the crosslinking of the epoxy to be brought to completion. A postcuring can optionally be employed in order to round off this crosslinking.

The amount of epoxy powder paint deposited results, after crosslinking, in a coating having a thickness lying between 250 micrometers and 700 micrometers, depending on the recommendations of the manufacturer.

7) On conclusion of the crosslinking of the epoxy, a stage of accelerated cooling, which consists in spraying water over the coated support, thus making it possible to more rapidly handle the pipes, can optionally be deployed.

An alternative form of this process consists in not preheating the pipe before the application of the powder. In this case, two conditions have to be met: the silane solution applied to the pipe has to be dry (all the water of the solution has to be evaporated) and a postcuring, on conclusion of the application of the epoxy powder, has to be provided for the crosslinking of the epoxy.

Example 2

Process for the surface treatment of a metal pipe and for the application of a three-layer coating comprising a base layer of epoxy powder paint.

The process for the treatment of a surface intended for the application of a three-layer coating comprising a base layer of epoxy powder paint is identical to the process described in example 1, from stage 1) to stage 6) inclusive. In the context of three-layer coatings, the thickness of the epoxy, which acts as primer, is generally between 50 and 500 micrometers.

A few seconds after the application of the epoxy powder, i.e. after stage 6), the adhesive is applied. Specifically, the time limit for covering the epoxy layer with the adhesive, determined by taking into account both the temperature of the support and the reactivity of the epoxy powder, is generally between 5 and 60 seconds.

The application of the adhesive takes place either by extrusion or by powder coating. The extrusion temperature is between 200° C. and 250° C. The thicknesses of adhesive which are deposited are generally between 200 and 500 micrometers.

The application of the adhesive is immediately followed by that of the finishing layer, composed of MD (medium density), LD (low density) or HD (high density) polyethylene or of polypropylene. The application of the finishing layer is also carried out by extrusion. The thicknesses of finishing layer which are deposited generally lie between 1.5 and 4 millimeters (mm).

On conclusion of the application of the finishing layer, the pipes are cooled by spraying water over their surface coated with the finishing layer.

Example 3

Process for the surface treatment of metal fittings and for the application of a monolayer coating based on epoxy powder paint.

The process includes stages 1) to 7) of example 1.

There may be an alternative form with regard to the technique for the application of the epoxy powder (stage 6)), which then consists in applying the powder to the fittings according to a specific technique for dipping in a fluid bed.

Examples 4

The additional examples below demonstrate very particularly the advantage of the process according to the invention in the context of the adhesive performance of the coating based on epoxy powder paint when the coating is subjected to a hot and humid environment.

In the context of the evaluation of the levels of adhesion of the organic coatings based on epoxy resin exposed in hot and humid surroundings, several test specimens were prepared and tested from metal plates. The term test specimen is used to describe a treated and coated plate.

Example 4A

An epoxy powder paint is applied using an electrostatic spray gun, the polarity of which is adjusted to a voltage of +70 kV (kilovolts). Steel plates with a length of 200 mm, a width of 100 mm and a thickness of 10 mm are used as metal substrates.

The epoxy powder paint has the following composition:

| | |
|---|---:|
| Type 4 bisphenol A solid epoxy resin | 59% |
| Acrylic leveling agent | 0.7% |
| Inorganic filler (kaolin) | 7.7% |
| Inorganic filler (barium sulfate) | 18.5% |
| Red pigment (iron oxide) | 2% |
| Pyrogenic silica | 0.2% |
| Phenolic hardener | 11% |
| Epoxy resin with addition product (methylimidazole) | 0.7% |
| Catalyst | 0.2% |
| TOTAL | 100% |

The percentages shown are percentages by weight, with respect to the total weight of the composition.

The gel time of this epoxy powder paint at 180° C., determined according to the standard ISO 8130-6, is 70±5 seconds.

Prior to the application of the powder, the steel plates are sandblasted by projection of abrasives "Rugos 2000®", grade 20-30 until a roughness Rz of between 70 and 90 micrometers is obtained. These abrasives are based on aluminum silicate. Their average chemical composition includes 51% of $SiO_2$ (combined total silica in the form of silicates) and 27% of $Al_2O_3$. The level of free silica is less than 0.1% and the level of chlorine and fluorine is less than 100 ppm. The bulk density of the abrasive is 1.3 and the hardness is between 6 and 7 mohs. The particle size is between 0.40 and 1.60 mm. This product does not comprise any heavy metal.

These plates are subsequently freed from dust by blowing with compressed air. The surface cleanliness obtained on conclusion of these operations corresponds to the level Sa 2.5.

The plates are subsequently preheated at 220° C. in a ventilated oven.

As soon as the temperature of the steel has reached 220° C., the plates are removed from the oven and connected to earth.

The powder is immediately applied to the metal support using the electrostatic spray gun described above. After application of the powder, the plates are placed in an oven at 200° C. for a postcuring which lasts 10 minutes.

The plates are subsequently cooled to ambient temperature. It is also possible to use the term test specimens at this stage.

For the tests, only the test specimens having epoxy thicknesses of between 350 and 450 micrometers are selected.

A control test specimen is used for the evaluation of the adhesion before immersion in hot water.

The evaluation of the adhesion is carried out according to two methods.

The first method corresponds to a tensile measurement carried out according to the standard ISO 4624. This method consists in using a steel or aluminum dolly with a diameter of 20 mm chemically bonded to the coating using a bonding material of "Araldite®" type. Before application of the bonding material, the coating is depolished with sandpaper in order to improve the attachment of the bonding material, in other words to improve its adhesive power.

After drying the bonding material for at least 24 hours, the dolly is pulled using a tensile testing device. The tensile force necessary to pull off the dolly is determined, along with the failure facies.

The tensile force is shown in newtons per unit of surface area, more particularly in newtons per square millimeter (N/mm²).

The failure facies can correspond to:
- an adhesive failure, that is to say a separation of the coating from its metal substrate;
- a cohesive failure, that is to say a failure of the coating within the body without separation of the coating from its metal substrate occurring; this scenario is preferable to the preceding scenario;
- a semiadhesive/semicohesive failure, which is a combination of the first two scenarios;
- a failure of the bonding material, that is to say a separation of the bonding material from the surface of the coating; in this case, the force which corresponds to the adhesion of the coating with regard to its metal substrate is unspecified but is regarded as equal to or greater than the force for failure of the bonding material; this scenario is favorable.

The second method for evaluation of the adhesion corresponds to the evaluation of adhesion through a peel test, such as described in the standard EN 10290 and the standard EN 10289.

Straight incisions with a length of 30 to 50 mm are made in the coating down to the metal substrate using a sharp knife placed against a steel ruler, in order to form an X with an angle of 30 degrees approximately at the point of intersection.

The tip of the knife is inserted horizontally (the flat of the blade) under the coating at the point of intersection of the incisions, so that the tip of the blade is in contact with the surface of the metal.

By levering against a fulcrum, such as a steel rod, the flat of the blade is moved away from the metal surface in a single movement and vertically, that is to say according to a direction at 90 degrees to the surface. The purpose of this operation is to attempt to pull off the coating.

The loss in adhesion of the coating is evaluated by the length in millimeters which corresponds to the part torn off (or peeled) from the point of intersection.

The other test specimens are immersed in municipal water. The water bath is maintained at a temperature of 80±2° C.

The test specimens are withdrawn from the hot water bath and cooled to ambient temperature after various immersion times.

The cooled test specimens are subjected to the evaluation of the adhesion according to the two methods described above.

The results are presented in the following table:

| Test | Before immersion | After immersion in water | | | |
| --- | --- | --- | --- | --- | --- |
| | | After 3 days | After 10 days | After 14 days | After 28 days |
| Tensile (N/mm²) | 25 | 24 | 14 | 14 | 13 |
| Failure facies | bonding material | adhesive | adhesive | adhesive | adhesive |
| Peel (mm) | 1 | 14 | 20 | >20 | >20 |

The results show that the epoxy coating immersed in water at 80° C. rapidly undergoes a decline in its performance of adhesion with regard to the metal substrate.

Example 4B

Several silane solutions are prepared:
- solution 1: 5% of N-(β-aminoethyl)-γ-aminopropyltrimethoxysilane ("Dynasilan®" A-1120) and 95% of ethanol.
- solution 2: 5% of N-(β-aminoethyl)-γ-aminopropyltrimethoxysilane ("Dynasilan®" A-1120) and 95% of municipal water.
- solution 3: 2.5% of N-(β-aminoethyl)-γ-aminopropyltrimethoxysilane ("Dynasilan®" A-1120) and 97.5% of municipal water.
- solution 4: 12.5% of aqueous solution comprising 40% by weight of 3-aminopropylsilane ("Dynasilan®" 1151) (i.e., 5% of pure silane) and 87.5% of municipal water.

These various solutions are prepared 24 hours before being applied. The metal substrates used for the tests are identical to those described in example 4A.

The metal substrates are subjected to sandblasting and are freed from dust as in example 4A.

On conclusion of these stages, the metal substrates are preheated at 40° C. in an oven and then immersed in one of the silane solutions. The immersion time, which corresponds to an operation for the application of silane by dipping, lasts 4±1 seconds.

The grammage of silane solution deposited on the metal substrate is determined by weighing.

The grammage is 50±10 g/m².

Immediately after the operation of dipping in the silane solution, the metal substrates are placed in an oven in order to be subjected to a preheating at 220° C. In accordance with example 4A, as soon as the temperature of the substrates is 220° C., the latter are removed from the oven and coated with the epoxy powder paint of example 4A. The powder paint is applied exactly according to the process described in example 4A.

After the application of the powder, the plates are post-cured in an oven at 200° C., in accordance with the process of example 4A.

The plates are subsequently cooled to ambient temperature. For the tests, only the test specimens for which the epoxy thickness is between 350 and 450 micrometers are selected.

The results are presented in the table below:

| Silane solution | Test | Before immersion | After immersion in water | | | |
|---|---|---|---|---|---|---|
| | | | After 3 days | After 10 days | After 14 days | After 28 days |
| Without (control) | Tensile (N/mm$^2$) | 25 | 24 | 14 | 14 | 13 |
| | Failure facies | bonding material | adhesive | adhesive | adhesive | adhesive |
| | Peel (mm) | 1 | 14 | 20 | >20 | >20 |
| 1 | Tensile (N/mm$^2$) | 21 | 19 | 19 | 20 | 21 |
| | Failure facies | bonding material | bonding material | bonding material | bonding material | bonding material |
| | Peel (mm) | 1 | 2 | 3 | 3 | 4 |
| 2 | Tensile (N/mm$^2$) | 22 | 21 | 19 | 20.5 | 21.5 |
| | Failure facies | bonding material | bonding material | bonding material | bonding material | bonding material |
| | Peel (mm) | 1 | 4 | 4 | 4 | 4 |
| 3 | Tensile (N/mm$^2$) | 20 | 19.5 | 22 | 22 | 18.4 |
| | Failure facies | bonding material | bonding material | bonding material | bonding material | bonding material |
| | Peel (mm) | 1 | 2 | 5 | 4 | 4 |
| 4 | Tensile (N/mm$^2$) | 19 | 19 | 20 | 21 | 19 |
| | Failure facies | bonding material | bonding material | bonding material | bonding material | bonding material |
| | Peel (mm) | 1 | 2 | 2 | 2 | 2 |

The results show that each silane solution, applied according to the process of the invention, makes possible an adhesion of the epoxy coating, after immersion in hot water, which is significantly improved with respect to the control of example 4A.

Furthermore, the use of silane diluted in water leads to similar results to those obtained from silane diluted in an organic solvent, such as ethanol. The use of water as diluent for silane is not harmful to the effectiveness of the latter.

Example 4C

Example 4C relates to the application of a three-layer coating. The coating is composed of an epoxy powder primer, of an adhesive and of a finishing layer.

The epoxy powder has the following composition:

| | |
|---|---|
| Type 4 bisphenol A solid epoxy resin | 59% |
| Acrylic leveling agent | 0.7% |
| Inorganic filler (kaolin) | 7.56% |
| Inorganic filler (barium sulfate) | 18% |
| Red pigment (iron oxide) | 3% |
| Phenolic curing agent (comprising 3.5% of 2-methylimidazole) | 10.75% |
| Pyrogenic silica | 0.2% |
| Epoxy resin with an addition product (2-methylimidazole) | 0.59% |
| Catalyst | 0.2% |
| TOTAL | 100% |

The percentages are percentages by weight, with respect to the total weight of the composition.

The gel time at 180° C. of this composition, determined according to the standard ISO 8130-6, is 40±5 seconds.

The adhesive is a polyolefin, the softening point of which, determined by differential scanning chromatography or DSC, is 135° C., grafted with radicals based on maleic anhydride. For example, the adhesive is a grafted adhesive "Orevac®" 18510 sold by Arkema.

The finishing layer is composed of HDPE (high density polyethylene).

Silane solution 5 is composed of 94.5% of municipal water, 5% of silane "Dynasilan®" 1151 and 0.5% of dye.

The coating is applied to the external wall of a steel pipe with a thickness of 7 mm and an external diameter of 116 mm.

After the sandblasting operation, carried out using the abrasive Rugos 2000® grade 20-30, the pipe is freed from dust by projecting compressed air onto its surface. The projection of abrasive brings the surface of the pipe to a temperature of 40° C.

Silane solution 5 is applied to the surface of the pipe with a brush. The targeted grammage is 50±10 g/m$^2$.

After the application of solution 5, the pipe passes through an inductor which raises the temperature of the steel to 220° C.

The powder primer is applied using an electrostatic spray gun adjusted to 75 kV. The thickness deposited is 120±30 μm.

The adhesive, which is extruded at a temperature of 230° C., is applied to the primer according to a covering time of 20 seconds. The thickness of the adhesive film deposited is 250±20 μm.

The finishing layer, which is also extruded at a temperature of 230° C., covers the adhesive according to a time limit of 10 seconds. The thickness of this layer is between 2.5 and 3 mm.

Pressure rollers compress the combined coatings in order to optimize the contact between the various layers.

The pipe subsequently passes through the cooling tunnel, 2 seconds after the application of the finishing layer. The cooling process consists in projecting cold water over the surface of the finishing layer.

On conclusion of these various operations, the pipe is cut into pieces with a length of 10 cm in order to provide test specimens intended to be subjected to the immersion resistance tests.

Within each test specimen, the three-layer coating is incised over its entire thickness, that is to say as far as the surface of the metal. For each test specimen, two incisions 2.5 cm apart are thus made over the whole of the circumference.

A second pipe is coated starting from the same coating system and according to the same process. The difference lies in the fact that silane solution 5 is not used.

After application of the coating, the test specimens are prepared in the same way as above. This second series of test specimens constitutes the series of control test specimens devoid of silane.

The two series of test specimens are immersed in water at 80° C., which is particularly severe. Specifically, the incisions made on the coating facilitate the insertion of water at the epoxy-metal substrate interface. This process rapidly results in a loss in adhesion of the epoxy with regard to the steel.

After immersing for 900 hours, the test specimens are removed from the bath for a qualitative evaluation of the adhesion.

An incision is made, along the axis of the test specimen, on the strip of coating with a width of 2.5 cm included between the two incisions made prior to the immersion stage.

The tip of the knife is inserted horizontally (the flat of the blade) under the coating from the incision made along the axis of the test specimen, so that the tip of the blade is in contact with the surface of the metal.

By levering against a fulcrum, such as a steel rod, the flat of the blade is moved away from the metal surface in a single movement and vertically, that is to say according to a direction at 90 degrees to the surface. The purpose of this operation is to attempt to pull off the coating.

The peeling by pulling off the coating is very easy as concerns the series of control test specimens. The strip with a width of 2.5 cm peels off along the entire circumference of the test specimens. In contrast, when the same test is carried out starting from the test specimens treated with the silane solution, it is impossible to completely peel the coating, the resistance to being pulled off of which is significantly greater.

Example 5

Other test specimens, obtained according to the same procedure as in example 4C, are used to test the influence of the application of the silane solution, according to the process of the present invention, on the performance with regard to resistance to cathodic disbanding. The principle of the trial consists in creating a defect in the coating in order to bare the metal. The defect is in contact with a saline solution, which acts as electrolyte.

The metal is brought to a potential corresponding to the cathodic protection, such that any oxidation of the iron forming part of the substrate is inhibited.

This voltage generates an electrolytic reaction which results in the formation of $OH^-$ ions and in the release of hydrogen. The effect of this electrolytic reaction can be more or less harmful with regard to the adhesion of the coating at the periphery of the initial defect. It is thus necessary to make sure that the cathodic protection is satisfactorily compatible with regard to the adhesion of the coating. This process is quantified through the length of the disbanding of the coating around the defect, at the end of a given time for application of the cathodic protection. This disbanding length is often referred to as the disbanding radius.

The trials were carried out according to the standard NFA 49710, at 23° C. for 28 days. The mean value of the disbanding radius, relative to the test specimen without silane, is 8 mm, whereas that corresponding to the test specimen with silane is 4 mm. This result shows that the application of the silane solution according to the process of the present invention results in an improvement in the resistance to cathodic disbanding of a coating based on epoxy powder.

What is claimed is:

1. A process for the application of a monolayer or multilayer anticorrosion coating to a metal substrate forming part of a pipe or of a fitting of a pipeline intended to be buried or immersed for the transportation of fluids, such as water, petroleum products, gas or drainage products, said process comprising the steps of:
   a) solely mechanically preparing a surface of the substrate, said preparing step including blasting by projection of abrasives;
   b) applying to the prepared surface an adhesion promoter composed of an aqueous solution of at least one silane, without additional chemical treatment other than steps c) and d);
   c) applying a layer of powder paint based on epoxy resin to the surface coated with the adhesion promoter; and
   d) applying at least one heat treatment to at least the surface of the substrate,
   wherein at least one stage d) of said at least one heat treatment is carried out between stages a) and b) or between stages b) and c), at a temperature of between 150 degrees Celsius and 250 degrees Celsius.

2. The process as claimed in claim 1, in which the surface preparing step includes:
   drying the substrate in order to remove therefrom any trace of moisture; and
   said blasting step comprises using at least one abrasive material selected from the group of shot, sand, alumina and corundum; and
   removing dust generated by the blasting by at least one of blowing and sucking and obtaining a surface cleanliness of between Sa 2.5 and Sa 3 and a roughness Rz of between 40 and 150 micrometers.

3. The process of claim 2, wherein said obtaining step comprises obtaining a surface cleanliness of Sa 2.5 and a roughness between 70 and 90 micrometers.

4. The process as claimed in claim 1, further comprising providing a substrate composed of a metal essentially including iron.

5. The process of claim 4, wherein said substrate providing step comprises providing a substrate composed of steel.

6. The process as claimed in claim 1, further comprising choosing said at least one silane from one of aminosilanes and epoxysilanes.

7. The process as claimed in claim 6, wherein said choosing step comprises choosing one of N-(β-aminoethyl)-γ-aminopropyltrimethoxysilane and γ-glycidyloxypropyltrimethoxysilane.

8. The process as claimed in claim 7, wherein said choosing step comprises choosing a prehydrolyzed silane.

9. The process according to claim 8, wherein said choosing step comprises choosing a prehydrolyzed 3-aminopropylsilane.

10. The process as claimed in claim 1, further comprising using an aqueous solution for the adhesion promoter which comprises between 0.5 and 20% by weight.

11. The process as claimed in claim 10, wherein said using step comprises using an aqueous solution for the adhesion promoter which comprises between 1 and 10% by weight of silane.

12. The process as claimed in claim 1, wherein said adhesion promoter applying step comprises applying the aqueous silane solution to the surface of the substrate according to a grammage of between 10 and 100 grams per square meter.

13. The process as claimed in claim 12, wherein said aqueous silane solution applying step comprises applying the aqueous silane solution to the substrate according to a grammage of between 30 and 70 grams per square meter.

14. The process as claimed in claim 1 further comprising carrying out the at least one heat treatment at a temperature between 150 degrees Celsius and 240 degrees Celsius.

15. The process as claimed in claim 1, additionally comprising:
   e) applying an intermediate layer of a polyolefin-based adhesive to the surface coated with said epoxy resin; and
   f) applying a finishing layer of polyolefin selected from the group of polyethylene and polypropylenes to the surface coated with the intermediate layer.

16. The process as claimed in claim 1, further comprising providing a metal substrate which is a pipe of the pipeline.

17. The process as claimed in claim 1, further comprising providing a metal substrate which is a fitting of the pipeline.

\* \* \* \* \*